Nov. 16, 1954 T. ULRICH 2,694,598
CONVERTIBLE TOP CONSTRUCTION
Filed Oct. 23, 1950 7 Sheets-Sheet 1

INVENTOR.
THEODORE ULRICH
BY Carl J. Barbee
HIS ATTORNEY

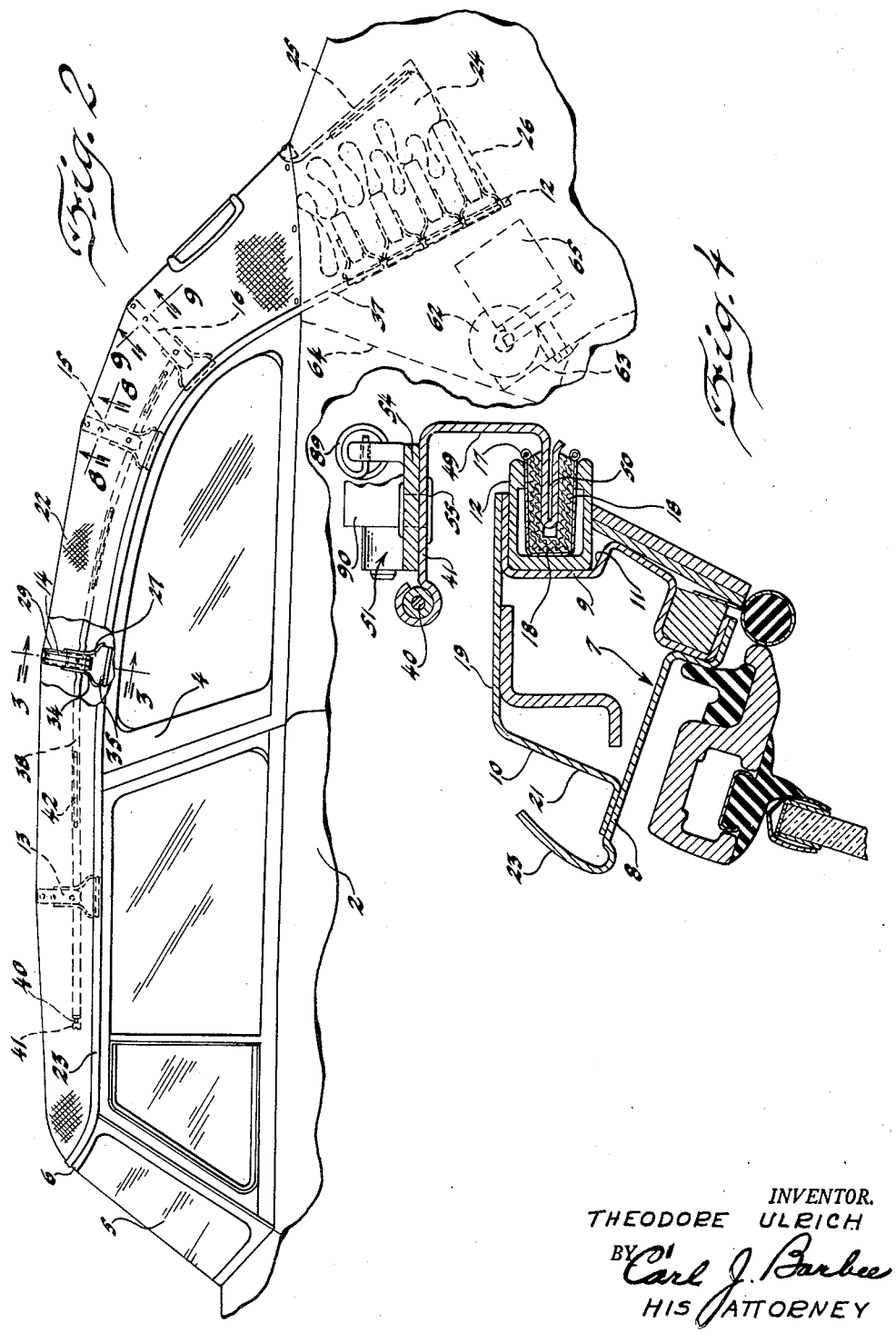

Nov. 16, 1954     T. ULRICH     2,694,598
CONVERTIBLE TOP CONSTRUCTION
Filed Oct. 23, 1950     7 Sheets-Sheet 3

INVENTOR.
THEODORE ULRICH
BY Carl J. Barkee
HIS ATTORNEY

Nov. 16, 1954     T. ULRICH     2,694,598
CONVERTIBLE TOP CONSTRUCTION
Filed Oct. 23, 1950     7 Sheets-Sheet 4
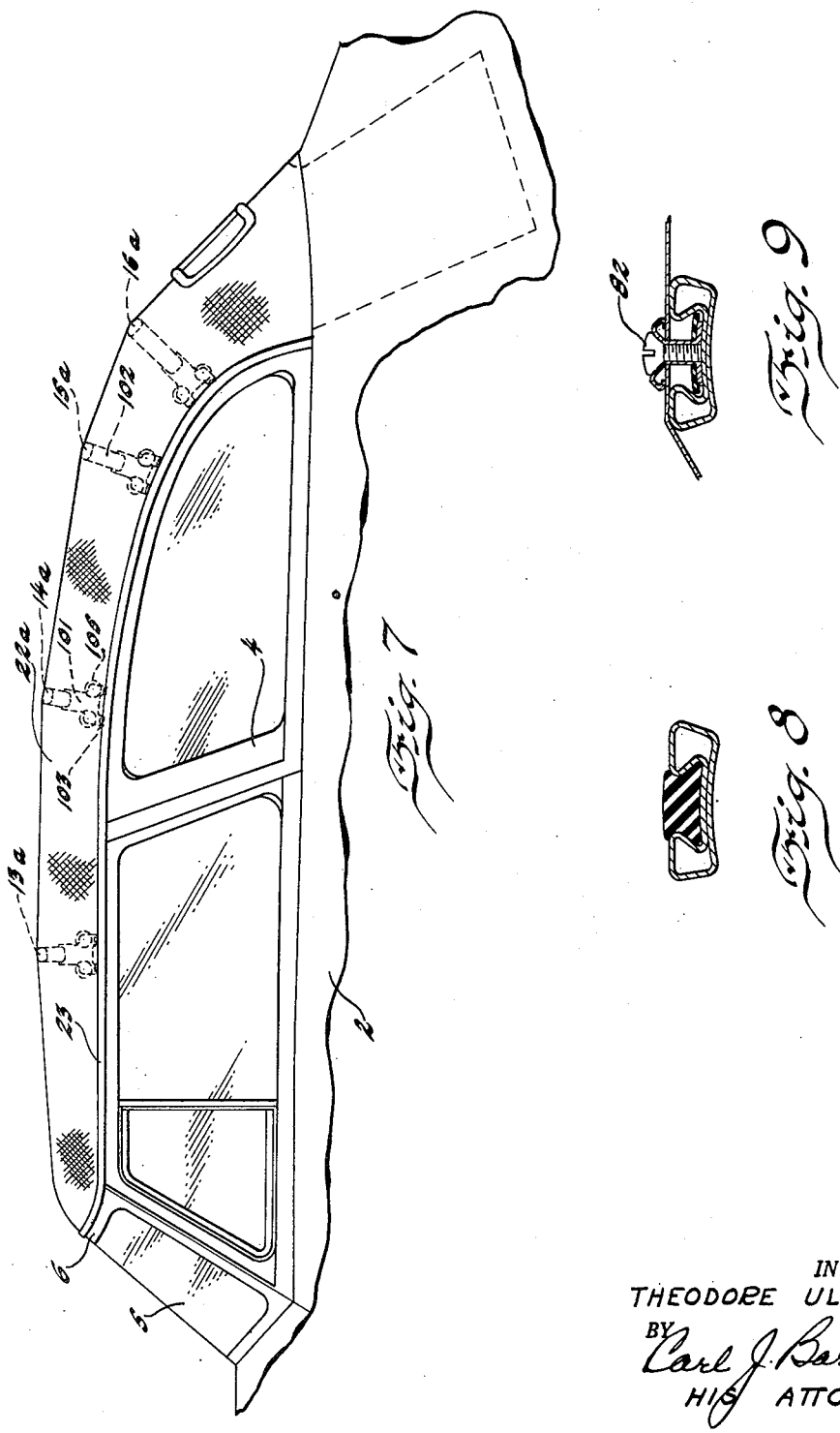
INVENTOR.
THEODORE ULRICH
BY Carl J. Barbee
HIS ATTORNEY Nov. 16, 1954 — T. ULRICH — 2,694,598
CONVERTIBLE TOP CONSTRUCTION
Filed Oct. 23, 1950 — 7 Sheets-Sheet 5
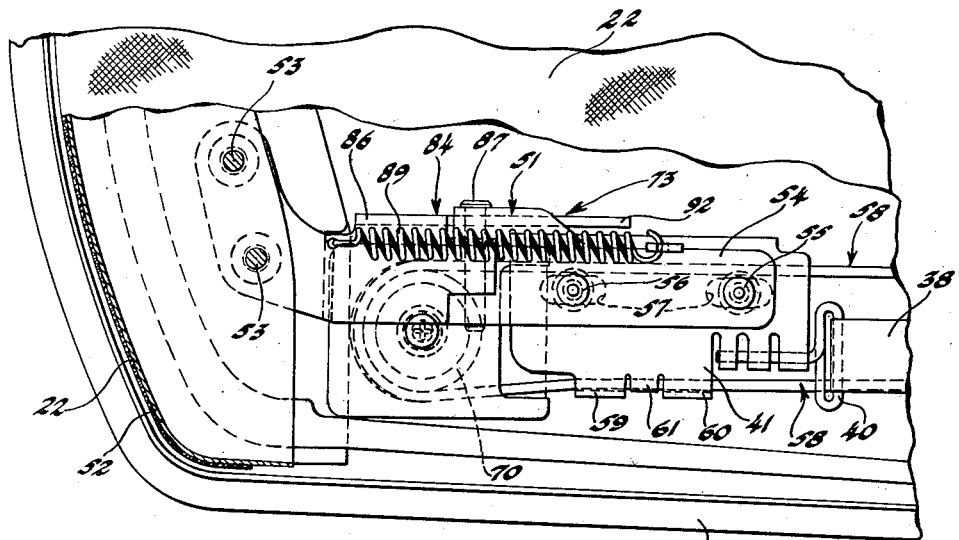
Fig. 10
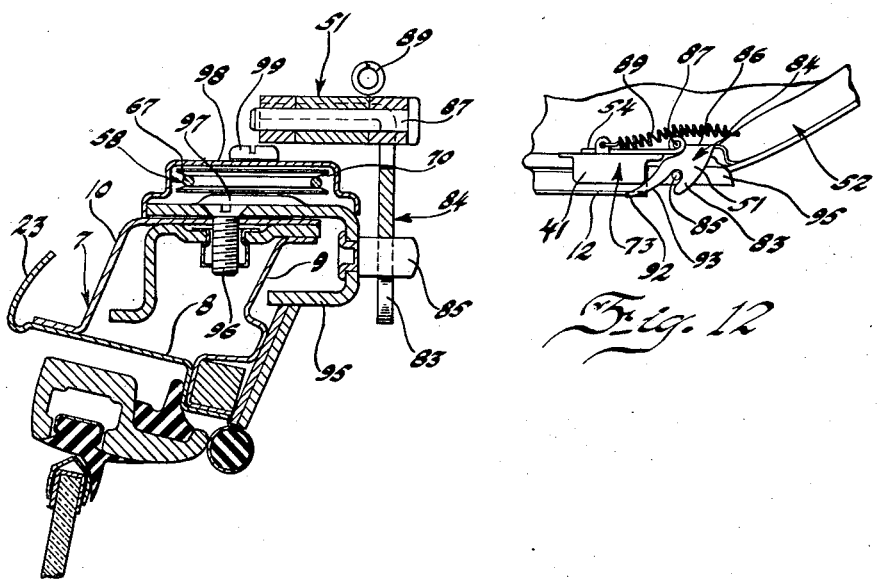
Fig. 11
Fig. 12
INVENTOR.
THEODORE ULRICH
BY *Carl J. Barbee*
HIS ATTORNEY Nov. 16, 1954 T. ULRICH 2,694,598
CONVERTIBLE TOP CONSTRUCTION
Filed Oct. 23, 1950 7 Sheets-Sheet 6

INVENTOR.
THEODORE ULRICH
BY Carl J. Barbee
HIS ATTORNEY

Nov. 16, 1954 T. ULRICH 2,694,598
CONVERTIBLE TOP CONSTRUCTION
Filed Oct. 23, 1950 7 Sheets-Sheet 7

INVENTOR.
THEODORE ULRICH
BY
HIS ATTORNEY

United States Patent Office 2,694,598
Patented Nov. 16, 1954

2,694,598

CONVERTIBLE TOP CONSTRUCTION

Theodore Ulrich, Detroit, Mich., assignor to Nash-Kelvinator Corporation, Kenosha, Wis., a corporation of Maryland Application October 23, 1950, Serial No. 191,642

2 Claims. (Cl. 296—107)

The invention relates to a convertible top construction for a vehicle. The principal object of the invention is to provide an improved type of convertible top construction. One object of the invention is to provide a vehicle having a rigid wall structure surrounding the occupants of the vehicle and at the same time providing a flexible overhead covering which may be raised or lowered at the will of the occupants.

Another object of the invention is to provide a vehicle having rigid side walls provided with rail members which extend from the front end of the passenger compartment of the vehicle to the rear end of such compartment, which rail members are arranged preferably in parallel fashion to each other to support and guide the flexible overhead covering during the raising or lowering thereof.

Another object of the invention is to provide a converticle covering for a vehicle which is raised or lowered automatically by power operated means.

Another object of the invention is to provide a vehicle having its structural members arranged so that a well is provided behind the rear seat to accommodate the flexible covering when lowered and also to accommodate the power actuating mechanism for raising and lowering the covering.

Another object of the invention is to provide novel means for crimping the flexible covering in selected locations during the lowering of the covering to prevent pinching thereof.

Another object of the invention is to provide a novel bow construction for use with the type of flexible covering employed herein.

Another object of the invention is to provide a novel arrangement of the structural members and the guiding rails incident to the supporting of the flexible covering and the raising and lowering thereof.

Another object of the invention is to provide a channel construction which prevents the bows from assuming a cocked position during lowering thereof.

Another object of the invention is to provide an automatic latching mechanism for clamping and unclamping the front header of the vehicle covering relative to the windshield frame.

Other objects and advantages of the invention will become apparent upon reading the following specification and upon examination of the drawings, in which:

Figure 2 is a side elevation of a portion of the vehicle showing one form of covering and associated bow construction;

Figure 4 is a fragmentary detailed sectional view taken on line 4—4 of Figure 6;

Figure 7 is a side elevational view similar to Figure 2 but showing a modified form of the invention;

Figure 8 is a sectional view through one of the bows taken on line 8—8 of Figure 2;

Figure 9 is a sectional view of the rear bow member taken on line 9—9 of Figure 2;

Figure 10 is a fragmentary plan view of the latch mechanism shown in Figure 6;

Figure 11 is a detailed sectional view taken on line 11—11 of Figure 6;

Figure 12 is a side elevational view (on a small scale) of the latching mechanism from the opposite side as shown in Figure 6;

The preferred form of the invention is shown in Figures 1, 2, 4, 5, 6, 8, 9, 10, 11, 12, 13, 14, and 15.

Figure 1:
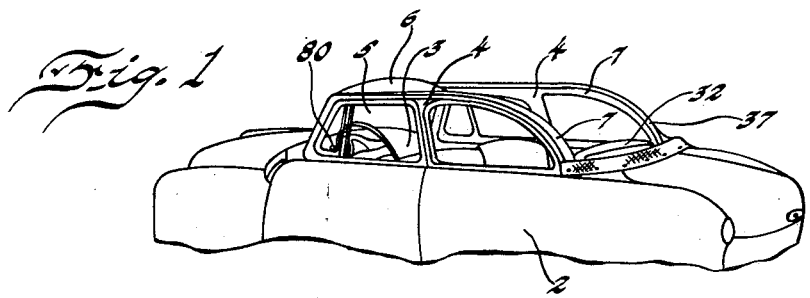
Figure 1 is a perspective view of a vehicle showing generally the rigid wall structure surrounding the passenger compartment and showing the flexible covering in lowered position.

Referring to Figure 1, there is shown generally a panel type body construction 2 which surrounds the passenger compartment 3. The body 2 is preferably of a "unitized" construction wherein the concealed structural members are welded to the exterior panel members, the side wall frame members 4 being incorporated into the overall "unitized" construction. Thus the side frame members 4 are very rigid and form protective walls which extend above the heads of the occupants of the vehicle. The windshield 5 of the vehicle with its associated supporting frame 6 is likewise of very rigid construction since the structural member 6 is also incorporated into the overall "unitized" construction.

Figure 3:
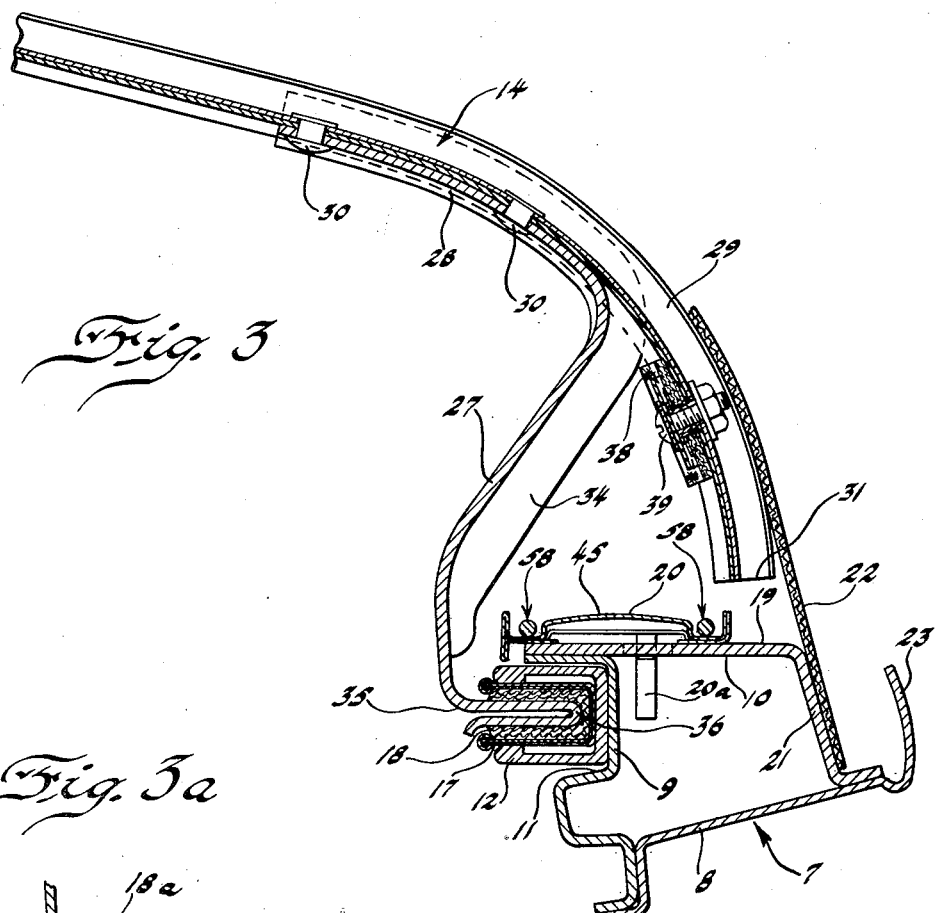
Figure 3 is a detailed fragmentary sectional view taken on line 3—3 of Figure 2.

Referring to Figure 3, the side frame members 4 have longitudinally extending structural members which may be formed of three principal sheet metal strips 8, 9, and 10, all of which are welded together to form box-type rail members referred to generally as 7. It will be noted that these rail members 7 extend from adjacent the windshield backwardly and then rather sharply downwardly at the rear end of the passenger compartment. These rail members are substantially parallel to each other throughout their longitudinal extent. The strip 9 may be formed with a channel 11 which extends throughout the length of each rail member 7 and a channel strip 12 is received in the channel 11 and is secured to the strip 9 and extends throughout the length of rail member 7, thereby providing the principal supporting and guiding channel for the bow assemblies 13, 14, 15, and 16. A second channel strip 17 may be formed of a comparatively thin strip of sheet steel serving as an inner liner for the channel strip 12. A second channel shaped inner liner 18 is preferably of fabric material of mohair (or imitation mohair) or some similar material, the reason for which will be hereinafter explained.

The strip 10 provides an upwardly exposed shelf surface 19 which carries the cable accommodating strip 20. The strip 20 may be formed from a sheet metal strip in the manner as shown in cross section in Figure 3 and strip 20 extends throughout the length of the rail member 7, being secured thereto by spring clips 20a. Strip 10 may have a downwardly depending side wall 21 extending throughout its length and providing a surface area for the flexible fabric overhead covering 22 to lay against in the overlapping manner as best shown in Figure 3. The strip 8 serves as a base plate to complete the box type rail 7 and the upwardly turned longitudinally extending lip 23 serves as a rain trough for expelling roof water at the rear end of the passenger compartment of the vehicle. It will be understood that the construction details as shown in Figure 3 are employed at both sides of the vehicle in reverse fashion.

The flexible fabric covering 22 (viewing Figure 2) is shown in raised position, wherein the covering completely covers the passenger compartment 3. Figure 2 also shows in dotted lines the approximate manner in which the flexible covering 22 nestles within well 24 when it is in fully lowered position. The well 24 may be formed of a sheet metal wall 25 and a sheet metal shelf 26 which span the width of the interior of the vehicle in back of the rear seat 32. It will be noted that the channel strips 12 with liners 17 and 18 extend down into well 24 at least as far as shelf 26, thereby assuring that the bow assemblies 13, 14, 15, and 16, are always in guided and supported association with the channels 12.

Each of the bow assemblies 13, 14, 15, and 16, has permanent shoes 27 secured at opposite ends thereof. The shoes 27 may have channel-shaped end portions 28 which partially embrace the bows 29 and may be secured thereto as by rivets 30. It will be noted that the bows 29 terminate at 31 short of the shelf 19 of rail 7.

It will be noted that the contour of the outer ends of the bows 29 blends in with the angle of inclination of the walls 21 so that the fabric cover 22 has a generally uninterrupted and smooth exterior contour.

The shoes 27 may be formed as sheet metal stampings having the reinforcing side flanges 34, the end tongue portions 35 being widened to assure necessary strength and to provide the desired sliding characteristics within fabric liner 18. The flap portions 35 are bent double, thereby providing a smooth rounded rear edge 36 to prevent any tendency of the flap 35 to snag the fabric liner 18.

Viewing Figure 2, it will be noted that when the covering is being lowered, the bow assemblies, beginning with the rear bow assembly 16, must travel down a rather sharp incline 37 and while traveling down this incline a predetermined amount of frictional resistance between tongues 35 and fabric liners 18 is necessary to prevent the bow assemblies from assuming a cocked position after traveling only part of the way down the incline. For example, if bow assembly 15 were to become wedged in a cocked position when only part way down the incline 37, this would prevent the covering assembly from lowering itself fully into the well 24 and would probably damage the power operating mechanism which raises and lowers the covering assembly. It has been found that the use of the type of fabric liner 18 (as hereinbefore described) in combination with the type of tongues 35 as described herein provides a suitable range of frictional resistance for causing the bow assemblies to travel down the incline 37 in substantially parallel fashion with each other and at substantially right angles to the base of channels 12.

Figure 16:
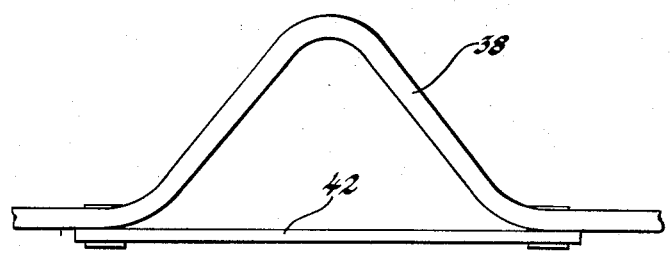
Figure 16 is a fragmentary detailed view of a modified form of construction of the means for crimping the covering while lowering same.

Each bow assembly 13, 14, 15, and 16, is interlinked with each other by means of a continuous strap 38, one end of which strap is secured to the rear bow assembly 16 and thence to each preceding bow assembly such as by means of bolts 39. The forward end of each strap 38 may be looped through and secured to an eye-screw 40 which in turn is secured to one end of bracket 41 (viewing Figure 10). There is, of course, a strap on each side of the vehicle for interlinking the bows at both ends thereof. The straps 38 serve the function of pulling the bow assemblies up into their proper positions when the covering 22 is raised. Since bow assemblies 13, 14, and 15, are not fastened in any way to the flexible covering 22, the straps 38 serve to properly space these bow assemblies when the covering 22 is raised. Straps 38 also perform the function of crimping the flexible covering 22 about mid-way between bow assemblies 13 and 14, 14 and 15, and 15 and 16. The crimping of the covering simply consists of those portions of the covering between the bow assemblies being urged outwardly away from the bow assemblies in the vicinity of the shoes 27, thereby preventing the fabric covering 22 from becoming pinched between the shoes 27 when the shoes come into contact with each other during the nestling operation in the lowering of the covering 22. Unnecessary wear on the covering is thus prevented in this manner. Viewing Figure 16, it will be noted that the strap 38 is caused to assume a looped condition by the contraction of the elastic strip 42 during lowering of the covering. When the covering is raised the straps 38 are stretched taut and the elastic strips 42 assume a stretched condition. When the covering is lowered the pressure on the straps becoming released permits the elastic strips 42 to contract to their normal length, thereby crimping the strap 38 against the covering 22. It will be noted that the type of strap employed in Figures 2 and 16 is mounted on the inner ends of the bows 29 (as viewed in Figure 3), the strap normally lying in a plane substantially vertical and the elastic strips 42 being secured to the face of the strap exposed toward the interior of the vehicle thereby causes the strap to be crimped outwardly away from the shoes 27.

Figure 15:
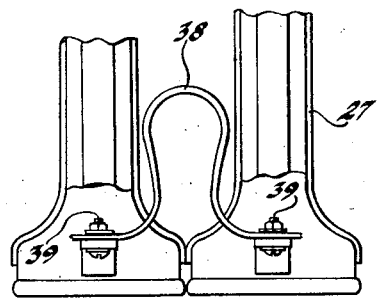
Figure 15 is a detailed fragmentary view of two of the bow assemblies showing manner of nestling when the covering is lowered.
Figure 14:
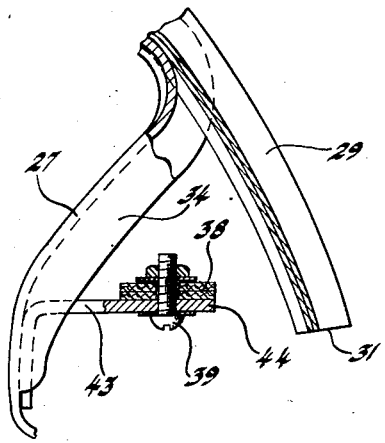
Figure 14 is a detailed fragmentary view of one end of one of the bow assemblies.

In the preferred form of the invention as shown in Figures 14 and 15 the strap 38 is secured to an angle iron 43, there being an angle iron secured to each shoe 27 of the bow assemblies. The outwardly extended wing 44 of each angle iron lies in a plane substantially horizontal or parallel with the upper surface 19 of strip 10. When the covering is lowered and the bows move closer to each other the straps 38 momentarily lay against the upper surface 45 of the channel strip 20 and as the bows move closer to each other, the strap 38 being of a somewhat stiff fabric is forced to loop upwardly away from surface 45 and thereby urges the covering 22 away from the shoes 27 so as to prevent the covering from becoming pinched between the shoes when the shoes come into contact with each other.

Figure 13:
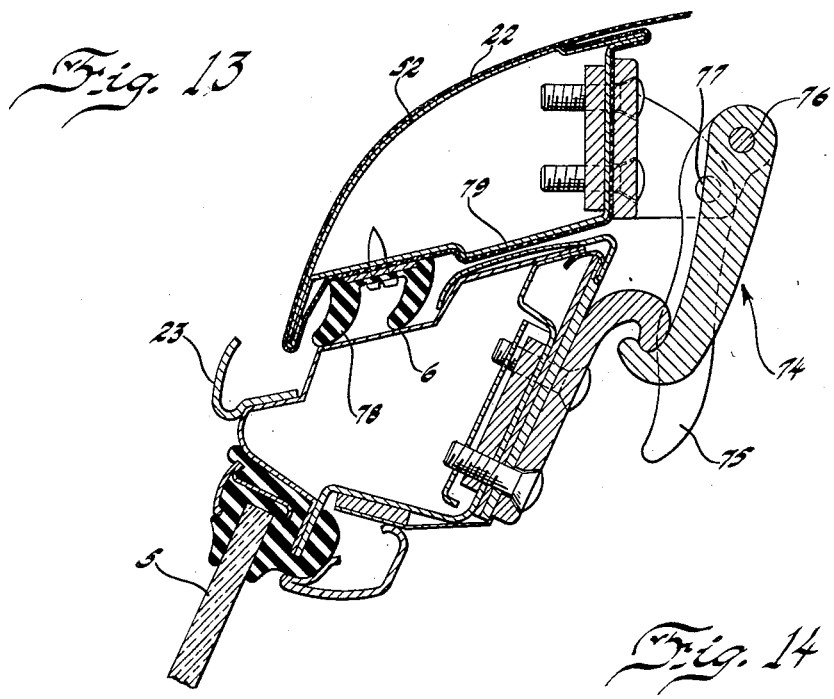
Figure 13 is a fragmentary detailed sectional view through the front header of the covering and through the windshield and associated frame of the vehicle.

The brackets 41 (one on each side of the vehicle) are provided with overhanging portions 49 which are bent double in the same manner as the shoes 27 so as to provide tongues 50, which ride in the fabric liner 18 in the same manner as the shoe tongues 35. A hinge assembly 51 is rigidly secured at one end to the front header assembly 52, such as by bolts 53. The rear wing 54 of the hinge assembly 51 is secured to bracket 41 by means of bolts or rivets 55 and 56. Longitudinal slots 57 permit limited longitudinal movement between hinge assembly 51 and bracket 41. The covering 22 is wrapped around the front header assembly 52 and secured thereto in the manner as shown in Figure 13. The operating cable (referred to generally as 58) is also secured to bracket 41 by means of the ears 59, 60, and 61, thus the covering is raised and lowered by means of the cable 58 through the medium of the cable 58 being secured to bracket 41. It will be noted that the covering 22 is secured only to the rear bow assembly 16, such as by screws 82 (see Fig. 9), and to the front header assembly 52 and during lowering of the covering the first bow assembly to be moved is 13 (it being bumped by header assembly 52), bow assembly 15 remaining stationary until bumped by 13 and 14, and so on until all of the bow assemblies are nestled one against the other before starting down the incline 37. The bracket 41, hinge assembly 51, and the attached header assembly 52, are thus the motivated portions of the flexible covering during the raising and lowering thereof.

Figure 5:
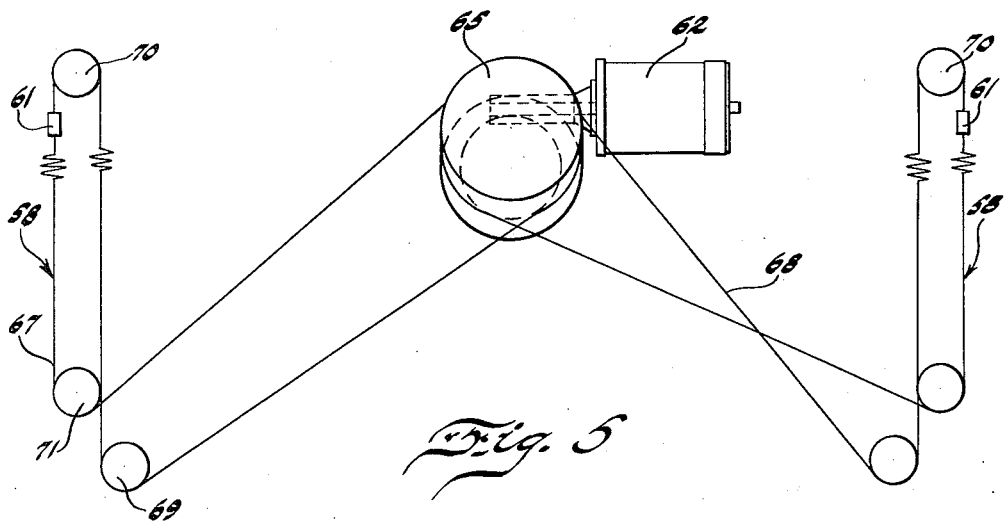
Figure 5 is a diagrammatic view of the pulley and cable arrangement for raising and lowering the covering.

Referring to Figure 5, a diagrammatic view of the power actuating mechanism for raising and lowering the covering is shown. A motor 62 may be mounted on a bracket member 63 which is preferably welded to a structural member 64 which provides a back rest for the rear seat 32 as well as providing a support member for bracket 63 and the motor 62. A drum 65 may be provided with peripheral grooves (not shown) in which the cable (generally designated as 58) operates. The cable assembly 58 may consist of a strand 67 and a strand 68 which extend from the drum 65 around pulley 69, thence to pulley 70, thence to the ear 61 on bracket 41, thence around pulley 71, and back to the drum 65. The cable strand 68 takes the same course on the opposite side of the vehicle. The motor 62 is preferably reversible so as to operate the drum 65 in either clockwise or counter-clockwise direction. Thus when the motor is operated in one direction the direction of movement of cables 67 and 68 causes the covering 22 to be lowered and when the motor is operated in the reverse direction the reverse direction of movement of the cables 67 and 68 causes the covering 22 to be raised.

It is significant to note that the latching mechanism, which may be generally referred to as 73, automatically operates to latch and unlatch the covering 22 as desired. In addition to the automatic latching mechanism 73, manual clamping means 74 are employed for securing the header assembly 52 tightly against the windshield frame 6 when the covering 22 is in fully raised position.

The clamping devices 74 are conventional and function by manual operation, handle 75 being pushed toward the windshield causing pivot 76 to swing past dead center relative to pivot 77 and thereby pulling the sealing strip 78 and shoulder 79 to be urged tightly against the adjacent surfaces of the frame 6. It is to be understood that the clamping devices 74 must be released manually by pulling back handles 75 before the covering 22 is lowered. With the clamps 74 released, the vehicle driver can raise or lower the covering 22 by pushing a switch button 80 which may be mounted on the instrument board, the switch having connection with electrical conductors (not shown) running to the motor 62.

Figure 6:
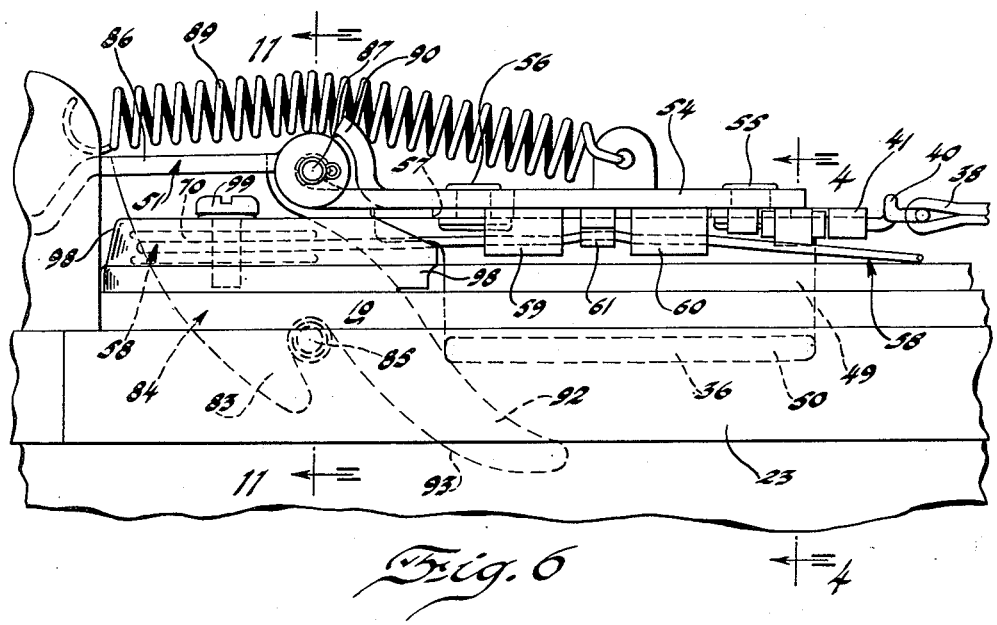
Figure 6 is a fragmentary side elevation of the latching mechanism located adjacent the windshield of the vehicle.

Assuming that the clamps 74 are released, the covering 22 being in raised position with the latching mechanism 73 in anchored position, as shown best in Figure 12, the operator pushes switch button 80 and the cables 67 and 68 commence moving in the direction in which ears 61 move toward pulleys 71. The initial movement of the cables 67 and 68 in covering lowering direction causes the forward prong 83 of the bifurcated tongue member 84 to be urged against the pin 85 and continued movement of the cables 67 and 68 in the same direction causes the hinge assembly 51 to commence moving toward a closed position. When the hinge assembly 51 is in fully opened position as shown in Figures 6 and 12 it will be noted that the axes of hinge pintle 87 and pin 85 lie in a common vertical plane and as the hinge assembly 51 commences moving toward the rear of the vehicle the wing 86 of the hinge assembly moves in a clockwise direction about hinge pintle 87, releasing the bifurcated tongue 84 from pin 85 and spring 89, which is under tension when in the position as shown in Figure 6, assists in continuing to swing the wing 86 into closed direction until it engages the upwardly protruding ear 90 which is formed in the other wing 54 of the hinge assembly 51. Thus the hinge assembly 51 and the header assembly 52 are swung back into this closed position during the lowering of the covering 22 and remain in this position through the action of spring 89 until such time as the covering is again operated into raised position. When the motor 62 is operated in the direction for raising the covering 22, the cables 67 and 68, moving in the opposite direction from that just previously described, cause the header assembly 52 and the latching mechanism 73 to be moved toward the windshield 5. The hinge assembly 51, being in the closed position previously described, moves toward the windshield until the elongated prong 92 of tongue 84 comes into contact with pin 85. The curved front edge 93 of the prong 92 permits a gradual sliding engagement of the front edge 93 against the pin 85 which causes the wing 86 of hinge assembly 51 to be rotated in counterclockwise direction, when viewing Figure 6, until the header assembly 52 is swung down against the receiving faces of the windshield frame member 6. At the moment when the header assembly 52 comes into engagement with frame member 6 the tongue 84 assumes the position with respect to pin 85, as is shown in Figures 6 and 12. The header assembly 52 is then secured against frame member 6 by means of the manual locking mechanisms 74. The slots 57 permit limited adjusting movement between hinge assembly 51 and bracket 41 to assure that the tongue 84 comes into correct engagement with pin 85, as shown in Figures 6 and 12. It will be noted that when the hinge assembly 51 reaches the fully opened position as shown in Figure 6, the prong 83 overhangs the pin 85 far enough to prevent spring 89 from causing the hinge assembly to swing back to closed position while locking the manual clamping mechanism 74.

Referring to Figure 11, it will be noted that a U-shaped bracket 95 is secured to the front ends of rail members 7, such as by means of screws 96. (It will be noted that the details of bracket 94 and associated parts are omitted from Figure 4 for clarity.) The pin 85 may be secured to bracket 95, for example, in the manner of a rivet, as shown in Figure 11. The bracket 95 may have a boss 97 formed therein which serves as a base for pulley 70. A cover 98 is secured to bracket 95 by means of a bolt 99 which also functions as the axle for the pulley. It will be understood that there are two latching mechanisms 73, one for each side of the vehicle.

Figure 3A:
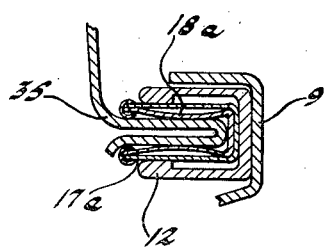
Figure 3a is a partial view of a modified form of the invention shown in Figure 3.

Referring to Figure 3a, I have shown a modified form of liner construction wherein instead of using the fabric liner 18 it may be desirable to employ a channel member 17a which may have a channel-shaped inner liner 18a formed of thin resilient material, such as spring steel, somewhat bowed in cross section so as to have continuous but yielding contact with the upper and lower faces of the shoe tongues 35. Thus a substantially pre-determined amount of frictional resistance between the shoe tongues 35 and inner liner 18a permits the tongues 35 to slide along within the inner liner 18a, however, the resistance to sliding is such as to prevent the bow assemblies from becoming cocked, particularly when traveling up or down the ramp portion 37.

Figure 17:
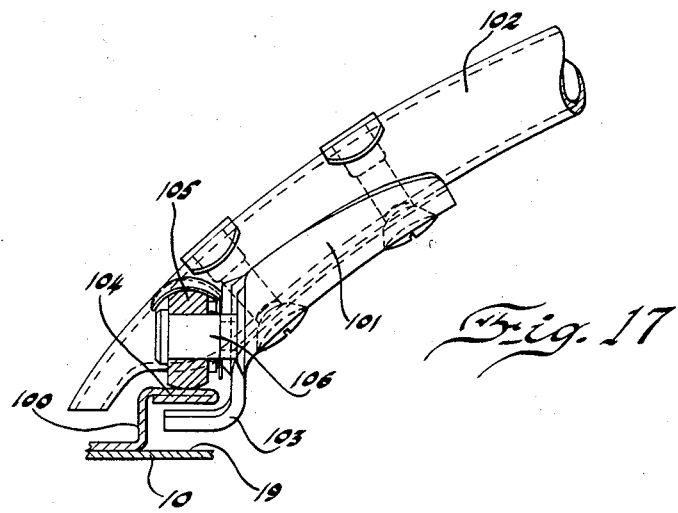
Figure 17 is a fragmentary detailed view of a modified form of bow assembly of the type used in the construction shown in Figure 7.

Referring to Figures 7 and 17, a modified form of the invention is shown wherein a roller type arrangement is used. A longitudinal strip 100, formed in cross section, as shown in Figure 17, may be welded or otherwise secured to the upper surface of strip 10 of rail member 7. The shoes 101, which are secured to tubular-like bows 102, may be provided with a downwardly depending tongue 103, which tongue is turned inwardly so as to overhang the ledge 104 of strip member 100. Rollers 105 are rotatably mounted on axles 106, which are secured to the tongues 103. The rollers 105 rest against the ledge 104, permitting the bow assemblies 13a, 14a, 15a, and 16a, to be readily moved relative to the rail members 7. In this type of construction it may be desirable to raise and lower the cover 22a manually, thereby eliminating the cable assemblies and associated drum and motor as well as the latching mechanisms 73.

Having thus described the invention, what is claimed is:

1. The combination of a vehicle having a movable overhead covering comprising: an enclosure including spaced side frame members, a header member, a rear bow member, several intermediate bow members positioned successively between the header member and the rear bow member, all of the bow members and the header member spanning the enclosure from one side frame member to the opposite side frame member, said bow members being movable relative to the side frame members and being supported by said side frame members for guided movement relative thereto, a flexible cover spanning the enclosure and resting on the bow members, said cover being secured only to the header member and to the rear bow member, each bow connected to the preceding bow by spaced flexible straps, elastic strips secured to said straps at predetermined positions along the length of the straps, said strips contracting into substantially unflexed condition when the covering is lowered thereby causing loops to form in the straps in a direction away from the elastic strips.

2. In a vehicle having an enclosure with rail members on opposite sides thereof and a flexible covering spanning the enclosure; means for urging pre-determined portions of the covering away from the rail members during lowering of the covering, said means including straps extending throughout a substantial portion of the length of the covering, elastic strips secured to the straps at predetermined positions along the length of the straps, said strips contracting into substantially unflexed condition when the covering is lowered thereby causing loops to form in the straps in a direction away from the elastic strips.

References Cited in the file of this patent

UNITED STATES PATENTS

| Number | Name | Date |
|---|---|---|
| 1,210,439 | Edwards | Jan. 2, 1917 |
| 1,697,073 | Leather | Jan. 1, 1929 |
| 1,786,662 | Leather | Dec. 30, 1930 |
| 1,836,191 | Seitz | Dec. 15, 1931 |
| 2,305,715 | Keller | Dec. 22, 1942 |
| 2,360,524 | Simpson | Oct. 17, 1944 |
| 2,501,392 | Keller | Mar. 21, 1950 |

FOREIGN PATENTS

| Number | Country | Date |
|---|---|---|
| 136,218 | Switzerland | Jan. 2, 1930 |
| 147,548 | Austria | Nov. 10, 1936 |
| 147,638 | Switzerland | Sept. 1, 1931 |
| 190,767 | Great Britain | Dec. 18, 1922 |
| 271,040 | Italy | Jan. 28, 1930 |
| 271,195 | Great Britain | May 26, 1927 |
| 330,391 | Great Britain | June 12, 1930 |
| 478,428 | Great Britain | Jan. 17, 1938 |
| 570,206 | Germany | Feb. 13, 1933 |